United States Patent [19]
Meek

[11] Patent Number: 6,111,574
[45] Date of Patent: Aug. 29, 2000

[54] METHOD AND SYSTEM FOR VISUALLY INDICATING A SELECTION QUERY

[75] Inventor: Christopher A. Meek, Kirkland, Wash.

[73] Assignee: Microsoft Corporation, Redmond, Wash.

[21] Appl. No.: 09/258,002

[22] Filed: Feb. 25, 1999

Related U.S. Application Data

[62] Division of application No. 08/843,959, Apr. 17, 1997, Pat. No. 5,933,145.

[51] Int. Cl.[7] ............................... G06F 3/14; G06F 17/30
[52] U.S. Cl. .......................... 345/349; 345/968; 345/348; 707/5; 707/4
[58] Field of Search ...................... 345/349, 968, 345/348, 354, 352, 334, 967; 707/5, 4, 6, 3, 2

[56] References Cited

U.S. PATENT DOCUMENTS

| | | | |
|---|---|---|---|
| 5,265,246 | 11/1993 | Li et al. ........................................ | 707/4 |
| 5,471,677 | 11/1995 | Imanaka ...................................... | 707/5 |
| 5,579,471 | 11/1996 | Barber et al. ........................... | 345/348 |
| 5,636,350 | 6/1997 | Eick et al. ........................... | 345/968 X |
| 5,678,012 | 10/1997 | Kimmich et al. .................... | 345/968 X |
| 5,787,411 | 7/1998 | Groff et al. .................................. | 707/2 |
| 5,890,152 | 3/1999 | Rapaport et al. ........................... | 707/6 |
| 5,946,678 | 8/1999 | Aalbersberg ................................ | 707/3 |

*Primary Examiner*—Raymond J. Bayerl
*Attorney, Agent, or Firm*—Michaelson & Wallace; Peter L. Michaelson

[57] ABSTRACT

A method and system for specifying a selection query for a collection of data items. The system allows a user to define a various conditions (e.g., "Supervisor=Smith") that relate to the collection. A unique icon is assigned to represent each condition. These icon can either be assigned automatically by the system or assigned by a user. When a selection query is to be specified, the system displays a selection query grid. The selection query grid contains a row for each possible combination of the defined conditions. Each possible combination is represented by displaying the icons for the conditions in that combination in the row. A user can then select which combinations should form the selection query by selecting rows of the selection query grid. The selection query is the logical-AND of each condition or logical inverse of each condition of a selected combination and the logical-OR of all the selected combinations. The system then uses this selection query to retrieve the data items from the collection.

6 Claims, 14 Drawing Sheets

| Employee | Name | Supervisor | Salary | Department |
|---|---|---|---|---|
| P. | | Smith | | |

*Fig. 1A*

| Employee | Name | Supervisor | Salary | Department |
|---|---|---|---|---|
| P. | | ≠Smith | | Marketing |
| P. | | | | Accounting |

VQL - List Tags

Table: Employee

| Icon | Tag |
|------|-----|
| ✓₁ | Department = Marketing |
| ✓₂ | Supervisor ≠ Smith |
| ✓₃ | Region = North America |
| ✓₄ | (~✓₁ AND ~✓₂ AND ✓₃) or<br>(✓₁ AND ✓₂ AND ~✓₃) |

METHOD AND SYSTEM FOR VISUALLY INDICATING A SELECTION QUERY

CROSS-REFERENCE TO RELATED APPLICATION

This application is a division of U.S. patent application Ser. No. 08/843,959, filed Apr. 17, 1997, now U.S. Pat. No. 5,933,145.

TECHNICAL FIELD

The present invention relates generally to information retrieval and, more particularly, to specifying a selection query for information to be retrieved.

BACKGROUND OF THE INVENTION

Information retrieval is one of the primary uses of computer systems. To retrieve certain information from a collection of data, an information retrieval system receives a specification of a selection query and then applies the selection query to the collection so that data that satisfies the selection query can be retrieved. For example, the collection of data may be a database table that contains records with various fields. A selection query would specify which records of the table are to be selected based on the value of fields in the records. For example, if the table contains a record for each employee in a company, the fields may include employee name, department, supervisor, and salary. A typical selection query may specify to select all records for employees whose supervisor is Smith. A user may specify such a selection query by entering:

Supervisor=Smith

An information retrieval system would select the records that satisfy this selection query and then retrieve the selected records.

Although the specifying of such a selection query is straightforward, it is much more difficult for a user to specify a more complex selection query. For example, if a user wants to retrieve all the records for employees who are in the marketing department but whose supervisor is not Smith and for employees who are in the accounting department, then a user would specify such a selection query by entering:

(Department=Marketing AND Supervisor≠Smith) OR (Department=Accounting)

Such selection queries are generally specified using Boolean logic. However, unless a user has had formal training in Boolean logic, the user may not fully understand the meaning of the various logic relations. In particular, users often confuse the logical-AND and logical-OR Boolean relations. In the example above, a user who is confused may incorrectly specify the selection query by entering:

(Department=Marketing AND Supervisor≠Smith) AND (Department=Accounting)

Although the second logical-AND would seem to be consistent with the statement "and for the employees who are in the accounting department," the use of such a logical-AND is incorrect. Also, users often do not fully understand the use of parentheses and find them cumbersome to use. In addition, the use of parentheses is a major source of errors in specifying selection queries by even those who understand Boolean logic. For example, a user may specify the selection query by entering:

Department=Accounting OR Supervisor≠Smith AND Department=Marketing

If the logical-AND and a logical-OR have equal precedence, then this selection query would specify to select the employees who are in both the accounting and marketing departments and the employees whose supervisor is not Smith and are in the marketing department. In other words, only employees who are in the marketing department and also who are in the accounting department or also whose supervisor is not Smith are selected. This specification does not correctly reflect the user's intention to select all employees in the accounting department.

Several techniques have been developed to help users specify a selection query. Two such techniques are Query-By-Example (QBE) and Venn diagrams. FIGS. 1A and 1B illustrate the use of Query-By-Example. QBE presents columns for various fields of a table and allows a user to enter the selection query into the columns. For example, to specify a selection query for all employees whose supervisor is Smith, the user enters "Smith" into the appropriate column as shown in FIG. 1A. To specify a selection query for all employees who are in the marketing department but whose supervisor is not Smith and for all employees who are in the accounting department, the user enters "≠Smith" and "Marketing" into the appropriate columns of the same row and enters "Accounting" into the appropriate column of another row as shown in FIG. 1B. The conditions (e.g., "Supervisor≠Smith") in a single row are logically-AND'd and the conditions in different rows are logically-OR'd to form the selection query. FIGS. 2A and 2B illustrate the use of Venn diagrams. After a user has specified a selection query, a Venn diagram can be displayed to help the user understand how the information retrieval system is interpreting the selection query. FIG. 2A shows the Venn diagram corresponding to the selection query of FIG. 1A. The circle represents all employees and the shaded region indicate those employees specified by the selection query. FIG. 2B shows the Venn diagram corresponding to the selection query of FIG. 1B. Each circle represents all employees. The shaded region in circle 201 indicates those employees who are in the marketing department and whose supervisor is not Smith. The shaded region in circle 202 indicates the employees in the accounting department. If the Venn diagram indicates that the selection query does not specify the records that the user intends to retrieve, the user can re-specify the selection query.

Selection queries can be used to specify retrieval from a variety of collections of data. These collections can include tables in a database system. files in a file system documents in a document management system, and Web pages on the World Wide Web. The relations in the selection queries are typically adapted to the type of data in the collection. For example, if a database table contains numerical data, then numerical relations (e.g., "≧") would be used. Also, the selection queries for documents may specify proximity relations (e.g., a certain word near another word or two words in the same sentence).

Information retrieval is especially fundamental to users of the World Wide Web (WWW). The WWW comprises thousands of computer whose information data can be retrieved by users of the WWW. Various WWW information retrieval systems are known as "search engines." These search engines typically require users to specify selection queries by entering conditions and Boolean relation. However, access to the WWW is increasingly becoming available to everyone. Since the vast majority of people do not fully understand Boolean logic, the specifying of the intended selection query has been problematic. It would be desirable to have a technique for specifying selection queries that would allow a typical user to correctly specify the intended selection query.

SUMMARY OF THE INVENTION

The present invention provides a method and system for specifying a selection query for a collection of data items. The system allows a user to define various conditions (e.g., "Supervisor=Smith") that relate to the collection. A unique icon is then assigned to represent each condition. These icons can either be assigned automatically by the system or assigned by a user. When a selection query is to be specified, the system displays a selection query grid. The selection query grid contains a row for each possible combination of the defined conditions. Each possible combination is represented by displaying the icons for the conditions in that combination in the row. A user can then select which combinations should form the selection query by selecting rows of the selection query grid. The selection query is the logical-AND of each condition of a selected combination and the logical-OR of all the selected combinations. The system then uses this selection query to retrieve the data items from the collection.

BRIEF DESCRIPTION OF THE DRAWINGS

FIGS. 1A and 1B illustrate the use of Query-By-Example.

FIG. 5 is a diagram illustrating the specifying of a selection query using a selection query grid.

FIGS. 6A and 6B are diagrams illustrating an example of how a user uses the VQL system to define a compound tag.

FIG. 8 is a diagram illustrating the relative preferences of tags.

DETAILED DESCRIPTION OF THE INVENTION

Figures 2A, 2B:
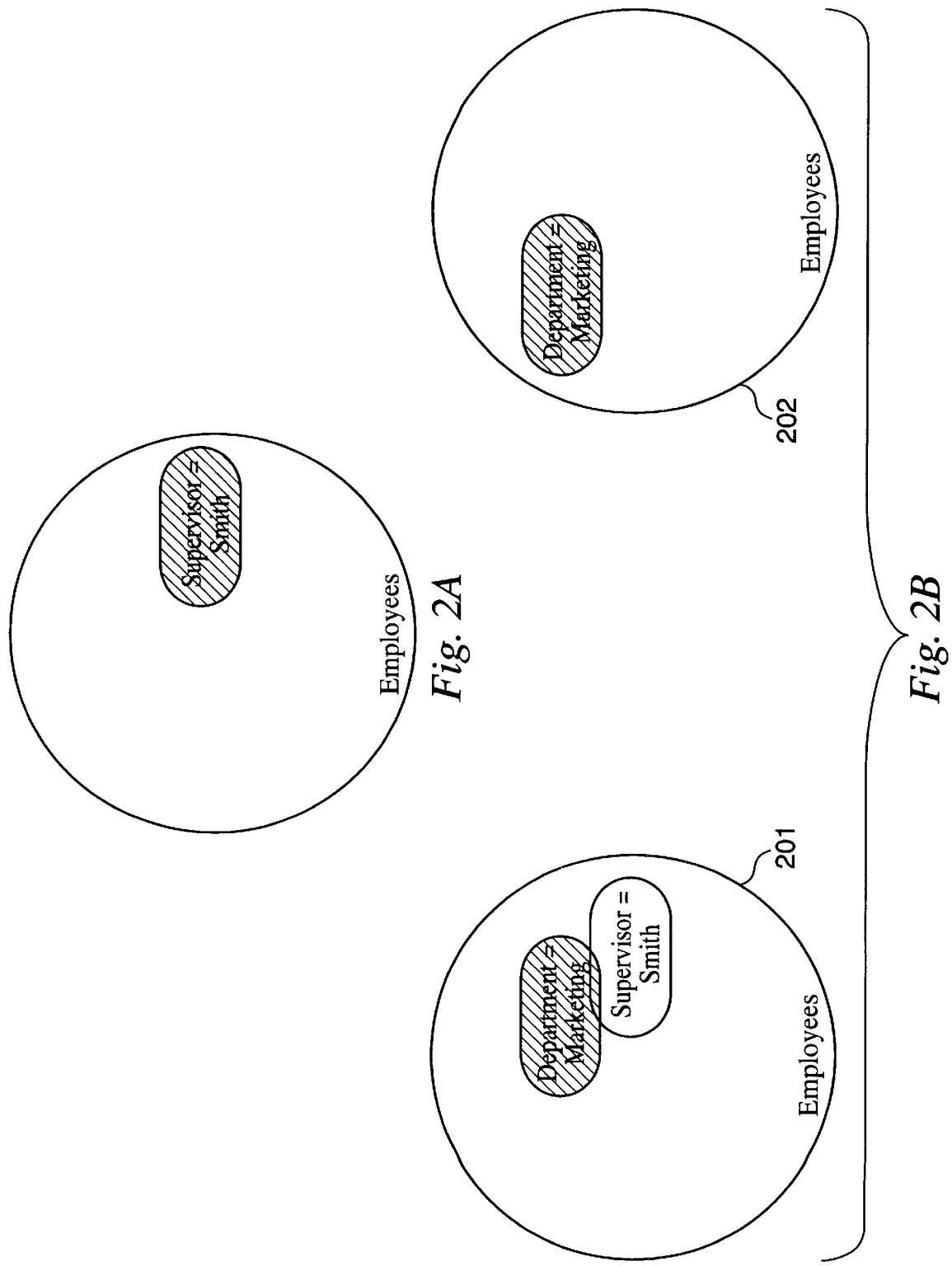
FIGS. 2A and 2B illustrate the use of the Venn diagrams.

The present invention provides a visual query method and system, referred to as the Visual Query Language (VQL) system, for specifying a selection query for a collection of data. The VQL system allows a user to define various "tagged retrieval types." A tagged retrieval type (i.e., tag) specifies a selection condition (e.g., "Supervisor≠Smith") that can be combined with other selection conditions to specify a selection query. A user can define various tags representing different selection conditions. When a user indicates that a selection query is to be specified, the VQL system displays a selection query grid with a row for each possible combination of the defined tags. For example, if three tags have been defined, then the selection query grid has 8 ($2^3$) rows. The following table illustrates all possible combinations of three tags displayed in a selection query grid.

| $Tag_1$ | $Tag_2$ | $Tag_3$ |
|---|---|---|
| 0 | 0 | 0 |
| 1 | 0 | 0 |
| 0 | 1 | 0 |
| 0 | 0 | 1 |
| 1 | 1 | 0 |
| 1 | 0 | 1 |
| 0 | 1 | 1 |
| 1 | 1 | 1 |

A "1" in a column indicates that the tag (e.g, "Supervisor≠Smith") is used in the combination, and a "0" in a column indicates that the logical inverse of the tag (e.g, "~(Supervisor≠Smith)") is used in the combination. For example, the fifth row contains "110," which indicates that $tag_1$ and $tag_2$ are in the combination and that the logical inverse of $tag_3$ is in the combination. A user would select the fifth row to specify a selection query that selects those data items that satisfy the condition of $tag_1$ and the condition of $tag_2$ and the logical inverse of the condition of $tag_3$ (i.e., $tag_1$ AND $tag_2$ AND ~$tag_3$). A user would select both the fourth and fifth rows to specify a selection query which selects those data items that satisfy the condition of $tag_3$ and that satisfy the logical inverse of the conditions of $tag_1$ and $tag_2$ and which selects those data items that satisfy the conditions of $tag_1$ and $tag_2$ and that satisfy the logical inverse of the condition of $tag_3$. The selection query is thus the logical-AND of the conditions indicated in a selected row and the logical-OR of the selected rows. In one embodiment, each tag is assigned a unique icon. The VQL system indicates the logical inverse of the condition of a tag in a row by the absence of the icon for that tag in the row. In addition, it is desirable that the icon assigned to a tag be suggestive of the condition of the tag. For example, an icon in the shape of a dollar sign might suggest that the tag represents a condition that an employee's salary is above a certain dollar amount. The use of a selection query grid is desirable for several reasons. First, the user can consider the data items in the collection as having these various tags assigned to them. Thus, the user simply selects those tagged data items when selecting the rows of the selection grid. Second, the user is presented with all possible combinations of the defined tags and simply needs to select the desired combination of tags. The user does not need to re-enter any conditions or tag identifiers. Third, the user does not need to be knowledgeable about Boolean logic. Rather, the user simply specifies to select data items with various combinations of tags. Fourth, as discussed below, a tag can represent a very complex condition. However, the selection query grid hides this complexity by displaying only an icon that represents even complex conditions.

Figure 3:
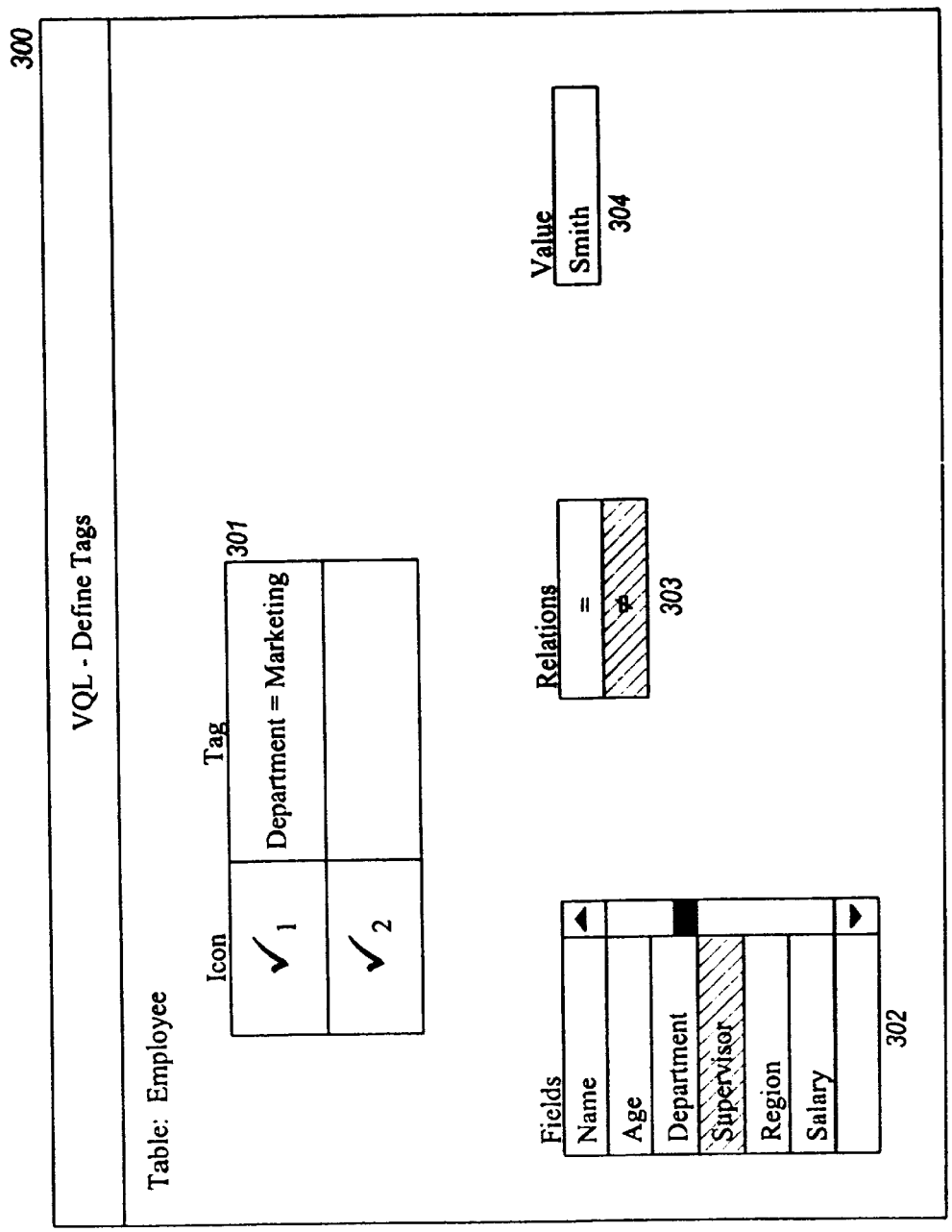
FIG. 3 is a diagram illustrating an example of how a user uses the VQL system to define a tagged retrieval type.

FIG. 3 is a diagram illustrating an example of how a user uses the VQL system to define a tagged retrieval type (i.e., tag) for the employee table. The VQL system displays screen 300 to allow the user to define a new tag for the employee table. The screen contains a tag definition list 301, a field scroll box 302, a relations list 303, and a value field 304. The tag definition list indicates that one tag is currently defined for the employee table. The defined tag represents the condition "Department=Marketing" and has been assigned an icon that is a check mark with a subscript of one (✓₁). The field scroll box, the relations list, and the value field are used by the user to specify the condition for the tag being defined. In one embodiment, the VQL system automatically assigns a ✓₂ as the icon for the tag to be defined. To define the new tag, the user scrolls through the field scroll box until the desired field is shown. In this example, the user has selected the supervisor field as indicated by the shading. In response to the selection of the supervisor field, the VQL system displays the relations list with the relations that are appropriate for the selected field. Since supervisor is a text field, text-related relations such as equal to ("=") are displayed. If a numeric field were selected, then the relations (e.g,, "<") appropriate for a numeric field would be displayed. In this example, the user has selected the not equal relation as indicated by the shading. The user then enters a value in the value field. In this example, the user has entered "Smith." The user would then select a button (not shown) to indicate that the definition is complete. The VQL system then updates the tag definition list with the newly defined tag (i.e., "Supervisor≠Smith"). In alternate embodiments, the VQL system may automatically assign tags of different colors or different shapes. The VQL system may also prompt the user for an indication of the icon to be assigned to a newly defined tag. Also, the VQL system may allow the user to enter text to describe the meaning of the tag, which may be displayed as a third column in the tag definition list.

Figure 4:
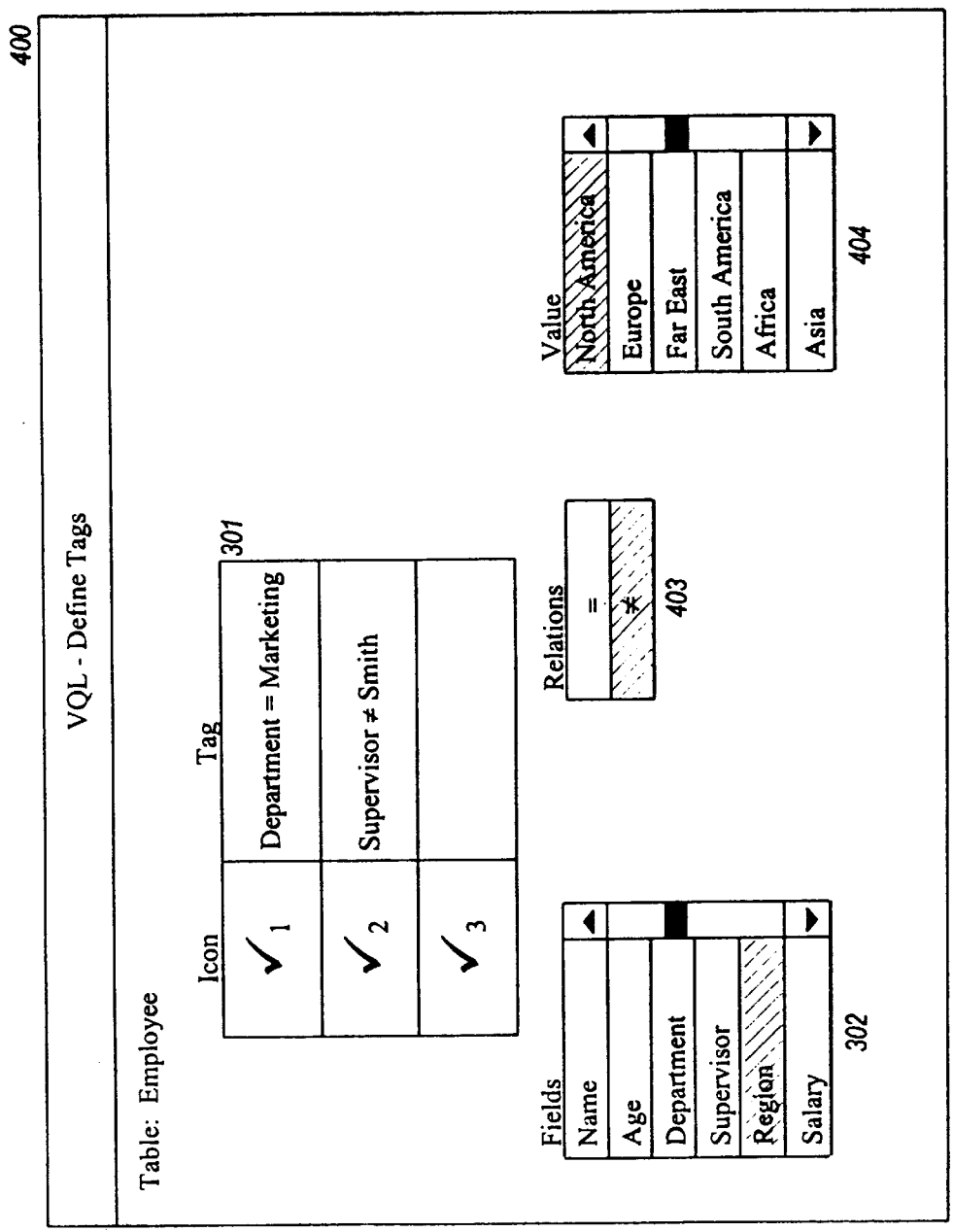
FIG. 4 is a diagram illustrating another example of how a user uses the VQL system to define a tagged retrieval type.

FIG. 4 is a diagram illustrating another example of how a user uses the VQL system to define a tagged retrieval type. The tag definition list 401 indicates that two tags have been defined. In this example, the user has selected the region field in the field scroll box 402 as indicated by the shading. When the user selects the region field, the VQL system displays the relations list 403 and the value scroll box 404. The value scroll box contains the possible values for the region field. The user then selects the equals relation of the relations list and selects the "North America" value of the value scroll box. When the user indicates that the tag definition is complete, the VQL system updates the tag definition list to show the newly defined tag (i.e., "Region= North America"). Alternatively, the VQL system allows a user to enter a series of conditions and a tag is defined as the logical-OR of these conditions. For example, after the user selects the "North America" value, the user may then select the "Europe" value before indicating that the tag definition is complete. If the user then indicates that the tag definition is complete, then the defined tag will be "Region=North America OR Region=Europe."

Figure 5:
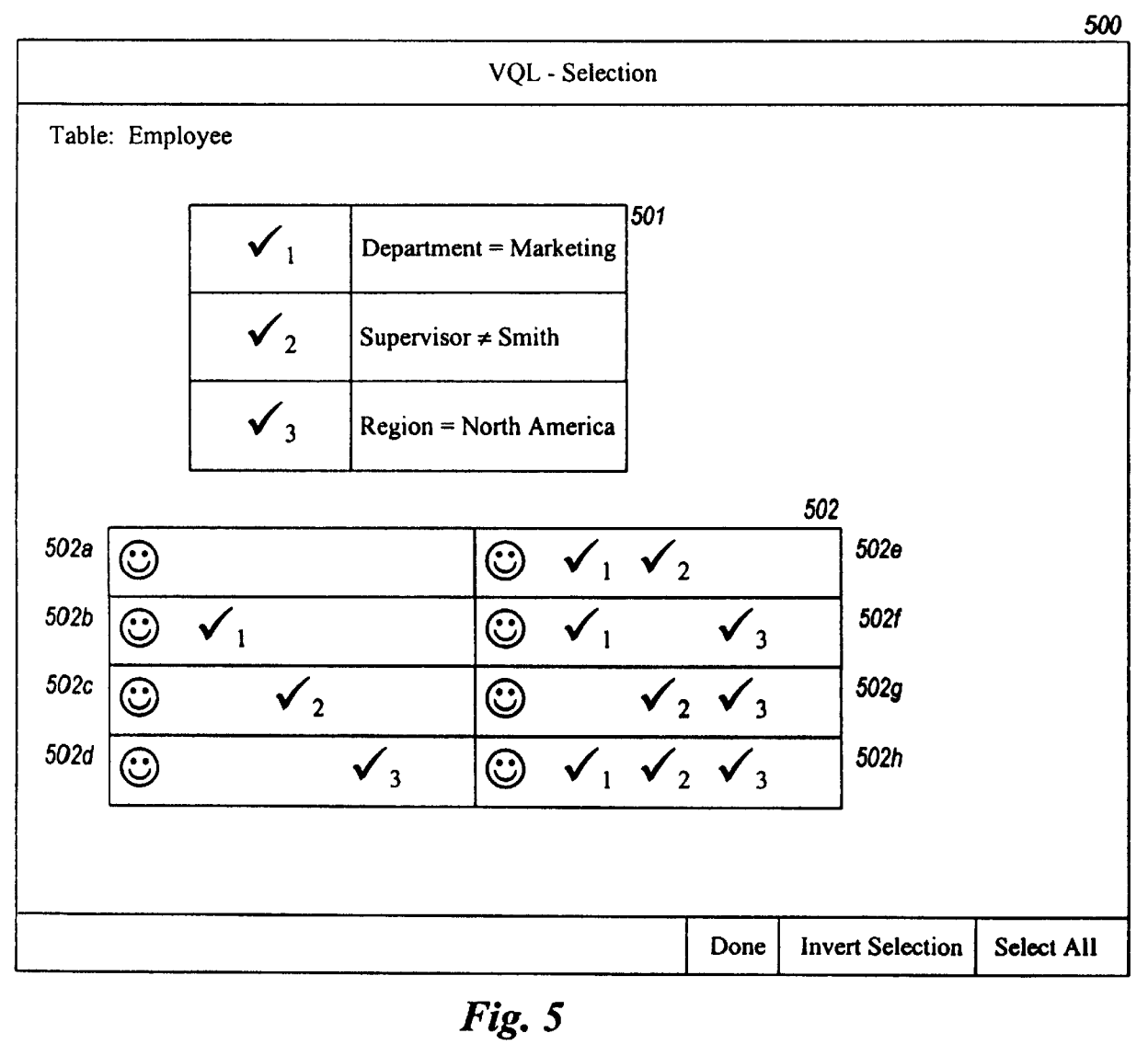

FIG. 5 is a diagram illustrating the specifying of a selection query using a selection query grid. The VQL system displays the tag definition list 501 and the query selection grid 502. The tag definition list identifies the currently defined tags. The selection query grid contains eight rows arranged in two columns. Each row corresponds to a possible combination of the currently defined tags. The absence of an icon for a tag in a row indicates the logical inverse of the tag in the combination. Alternatively, each icon could be displayed in each row and the universal not symbol (" ⊘ ") could be superimposed to indicate the logical inverse of a tag. Each row also contains an icon representing the collection of data to which the tags apply. In this example, the smiling face icon represents the employee table. However, such an icon representing a collection can also be omitted from the rows. To specify a selection query, a user selects rows of the selection query grid. The selection query is the logical-AND of the condition of each tag represented in a selected row and the logical-OR of the rows. For example, row 502d contains the icon (✓₃) for tag₃. Thus, if the user selects only row 502d, the selection query will be the condition for tag₃ and the logical inverse of tag₁ and tag₂ (i.e., "Region=North America AND Department≠Marketing AND Supervisor=Smith"). If the user selects both rows 502d and 502e, then the selection query for row 502d is logically-OR'd with the selection query for row 502e. That is, the selection query will specify to select all employees in the North American region who are not in the marketing department and whose supervisor is Smith and to select all employees in not in the North American region who are in the marketing department and whose supervisor is not Smith. This selection query is represented by the following:

(Department≠Marketing AND Supervisor=Smith AND Region= North America) OR (Department=Marketing AND Supervisor≠Smith AND Region≠North America)

As the number of defined tags increases, the number of rows in the selection query grid increases exponentially. Thus, in one embodiment, the VQL system can display the tag definition list and prompt the user to select which tags should be used to form the selection query grid. In this way, the user can limit the selection query grid to those tags that will be used to form the query.

Figure 6A:
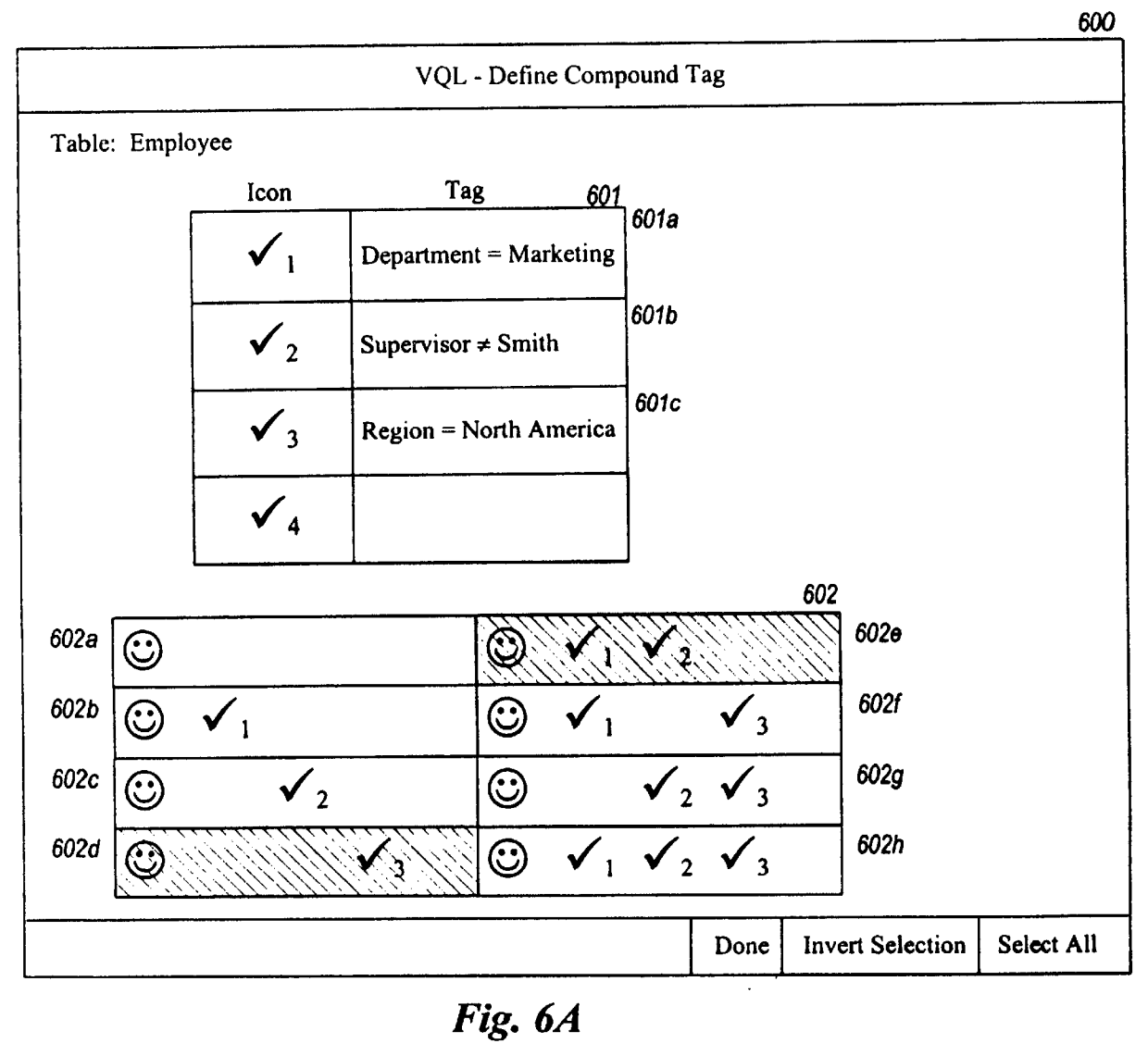

FIG. 6A is a diagram illustrating an example of how a user uses the VQL system to define a compound tag. A compound tag is a tag that is defined using other tags. When a user selects to define a compound tag, the VQL system displays screen 600. The screen contains tag definition list 601 and contains the query selection grid 602. In this example, the user may select row 602d and row 602e as the definition for the fourth tag, which is the compound tag. Thus, the compound tag₄ represents the logical-AND of the logical inverse of the conditions of tag₁ and tag₂ and the condition of tag₃ logically-OR'd with the logical-AND of the conditions of tag₁ and tag₂ and the logical inverse of the condition of tag₃. FIG. 6B is a diagram illustrating the definition of the compound tag. Compound tags can be specified of arbitrary complexity. The use of a text description is especially useful to describe a compound tag. For example, a user may enter the text "Employees to be reviewed" to describe tag₄. As an alternative to using the selection query grid, the VQL system may allow a user to simply select a tag that can be used as the selection query. In this way, a user can define a tag representing a complex selection query once and use the tag many times without re-selecting rows from the selection query grid. The button at the bottom of screen 600, as shown in FIG. 6A, facilitates the selection of multiple rows of the selection query grid. The "Select All" button allows a user to select all the rows. The user can then de-select the rows that are not to be included in the selection query. The "Invert Selection" button allows a user to select all rows that are currently de-selected and de-select all rows that are currently selected. As described above, in one embodiment, the VQL system can allow a user to indicate which of the defined tags are to be used to form the query selection grid for the compound tags, rather than using all of the defined tags.

Figure 7:
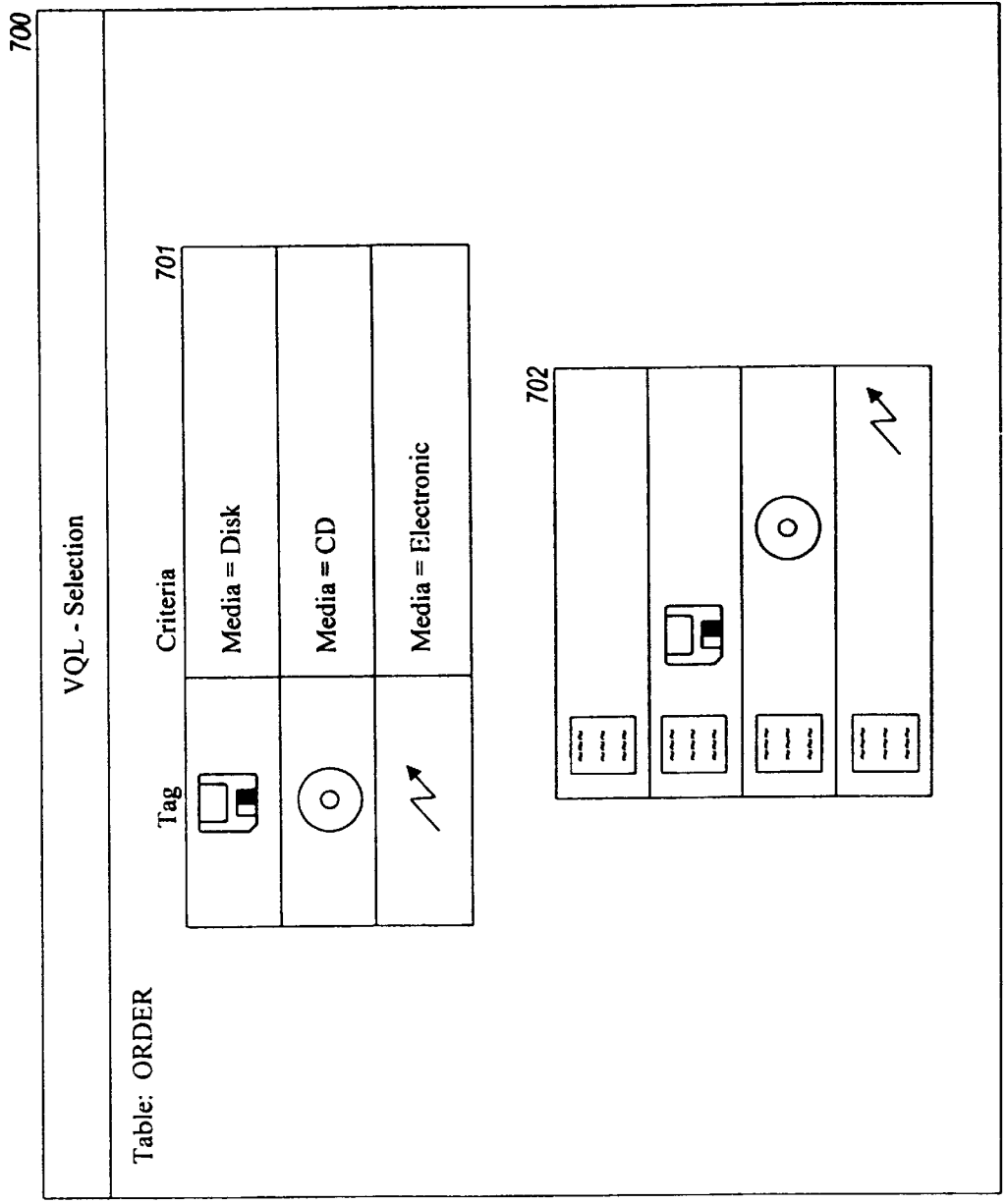
FIG. 7 is a diagram illustrating both suggestive icons for tags and exclusive tags.

FIG. 7 is a diagram illustrating both suggestive icons for tags and exclusive tags. A suggestive icon is an icon whose shape, color, or other characteristic represents the meaning of the condition. For example, an icon of a skull and crossbones could represent a tag for an undesirable condition. Also, a red icon in the shape of a car could represent a condition of a red car, and a gray icon in the shape of a seat could represent a condition of a gray upholstery for a car seat. Exclusive tags represent conditions that cannot both be satisfied by a data item in the collection. For example, if a tag represents the condition that the department is marketing and another tag represents the condition that the department is accounting, these tags are exclusive because no employee can be in two departments at once. Consequently, the VQL system detects such exclusive tags and displays the selection query grid so that combinations with exclusive tags are omitted. In the example of FIG. 7, three tags have been defined indicating the media field is equal to disk, the media field is equal to CD, and the media field is equal to electronic. The shape of the icon is suggestive of the value for the field. It is desirable that suggestive tags be used when possible. In this example, the tags for the media field are exclusive. That is, the media field can only contain the value disk or CD or electronic but not a combination. Thus, the VQL system displays the selection query grid 702 that shows only four rows, rather than eight rows of all possible combinations. The rows containing impermissible combinations of these tags have been omitted. For example, the displaying of a row containing the disk and CD tags would be meaningless since no record could ever satisfy both conditions.

Figure 8:
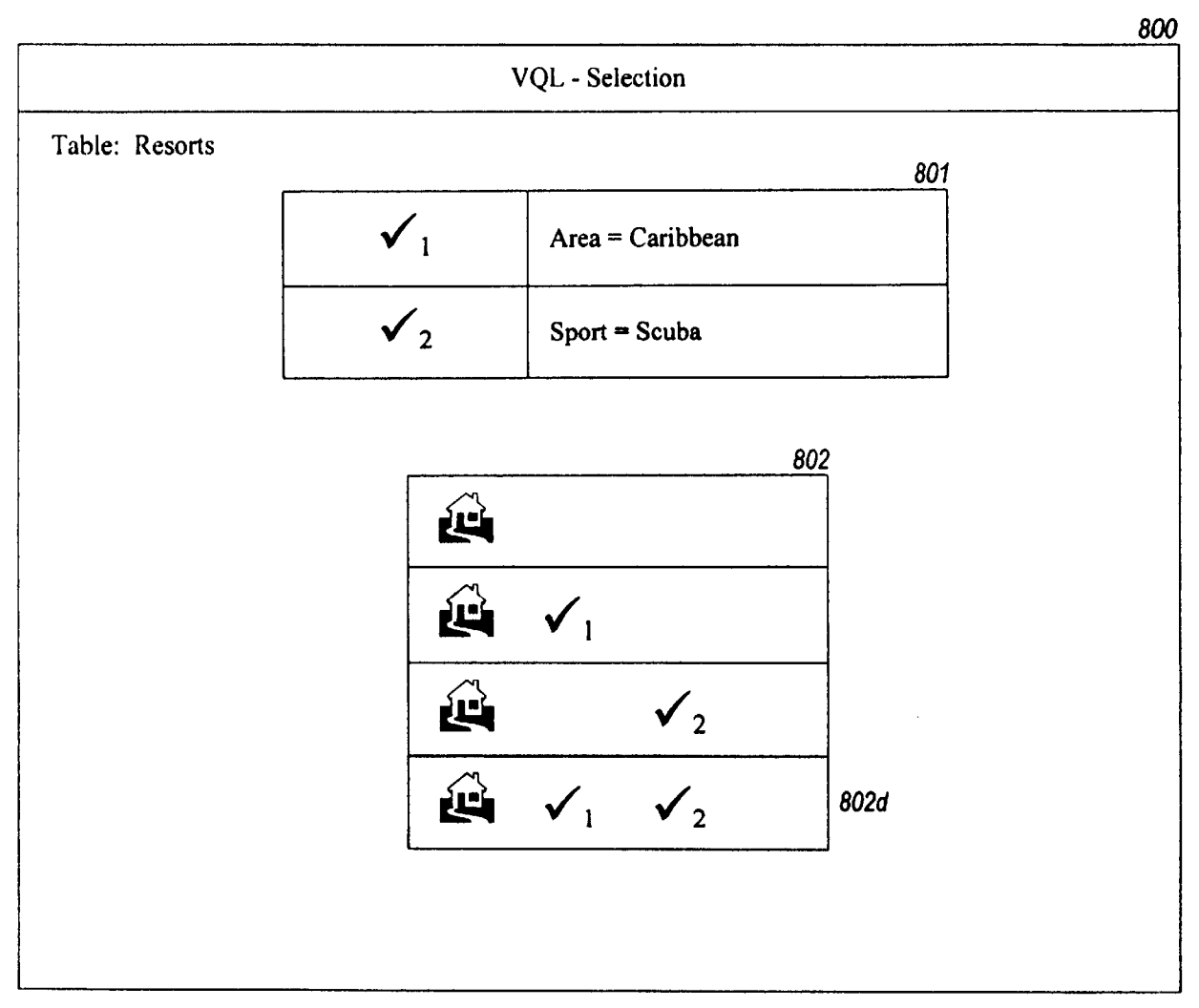

FIG. 8 is a diagram illustrating the relative preferences of tags. Information retrieval systems, such as search engines for the World Wide Web, may select vast numbers of documents that literally satisfy a selection query. For example, a selection query that selects all documents which contain the word "Caribbean" or the word "scuba" may result in hundreds of documents being retrieved. A user would typically like to have documents returned in the order of their relevance. The VQL system allows a user to specify a relative preference between tags that are combined into a selection query. For example, if the user may assign a higher preference to the word "Caribbean" and a lower preference to the word "scuba," which would mean that the user would prefer to have those documents that contain both words returned first, followed by those documents that contain the word "Caribbean" but not the word "scuba" and finally by those documents that contain the word "scuba" but not the word "Caribbean." Generally, each tag can be assigned a preference value between 0 and 1 and the relevance of a document can be computed by the following formula:

$$R = \sum_{i=1}^{N} \begin{cases} P_i & \text{if } tag_i \text{ is satisfied by the document} \\ 0 & \text{otherwise} \end{cases}$$

where R is the relevance of the document and $P_i$ is the preference value of the $i^{th}$ tag. Also, a preference value could be negative which would effectively reduce the overall relevance if a document satisfies the tag. Alternatively, the preference value $P_i$ could be multiplied by the degree to which the $i^{th}$ tag is satisfied by the document. For example, if the tag indicates the word "Caribbean," then the degree to which a document satisfies that tag may be the number of occurrences of the word "Caribbean" in that document divided by the number of words in the document.

In the example of FIG. 8, though the icons are shown as being the same size, the icon for $tag_1$ could be much larger than the icon for $tag_2$. If, during defining $tag_1$ and $tag_2$, the user were to indicate a higher preference for $tag_1$, then, the icon for $tag_1$ could be larger, which provides a visual feedback of relative preference to the user. The relative size of icons can also be used to indicate relative preference in a "fuzzy" selection query. A fuzzy selection query is a selection query for which the selected data does not need to satisfy the conditions literally. Rather, a fuzzy selection query includes a preference for each of the tags in the selection query. For example, a database of the performance of mutual funds may contain fields such as type of mutual fund and performance for each year. A user may want to identify bond mutual funds whose net asset value has increased by an average of 10% in the last three years. However, the user may also be interested in non-bond mutual funds that have had exceptional performance in the last three years. The user would like to see the mutual funds listed based on how closely they match the user's preferences. To specify such a fuzzy query, a user would define a tag for the condition "type=bond" and a tag for the condition "performance>10% for last 3 years." The preference, as described above, for each tag could be a value between 0 and 1. The icons for the tags could be displayed in sizes based on their preference. A tag with a preference of 0.5 would have an icon that is one-half the size of the icon for a tag with a preference of 1. Also, a special icon could be used to specify the preference of each tag. For example, the icon of balanced scale (" ⚖ "), an apothecary weight (" ⚖ "), or dumbbell (" ○═○ ") can be displayed for each tag with a size indicating the relative preferences of the tags.

Figure 9:
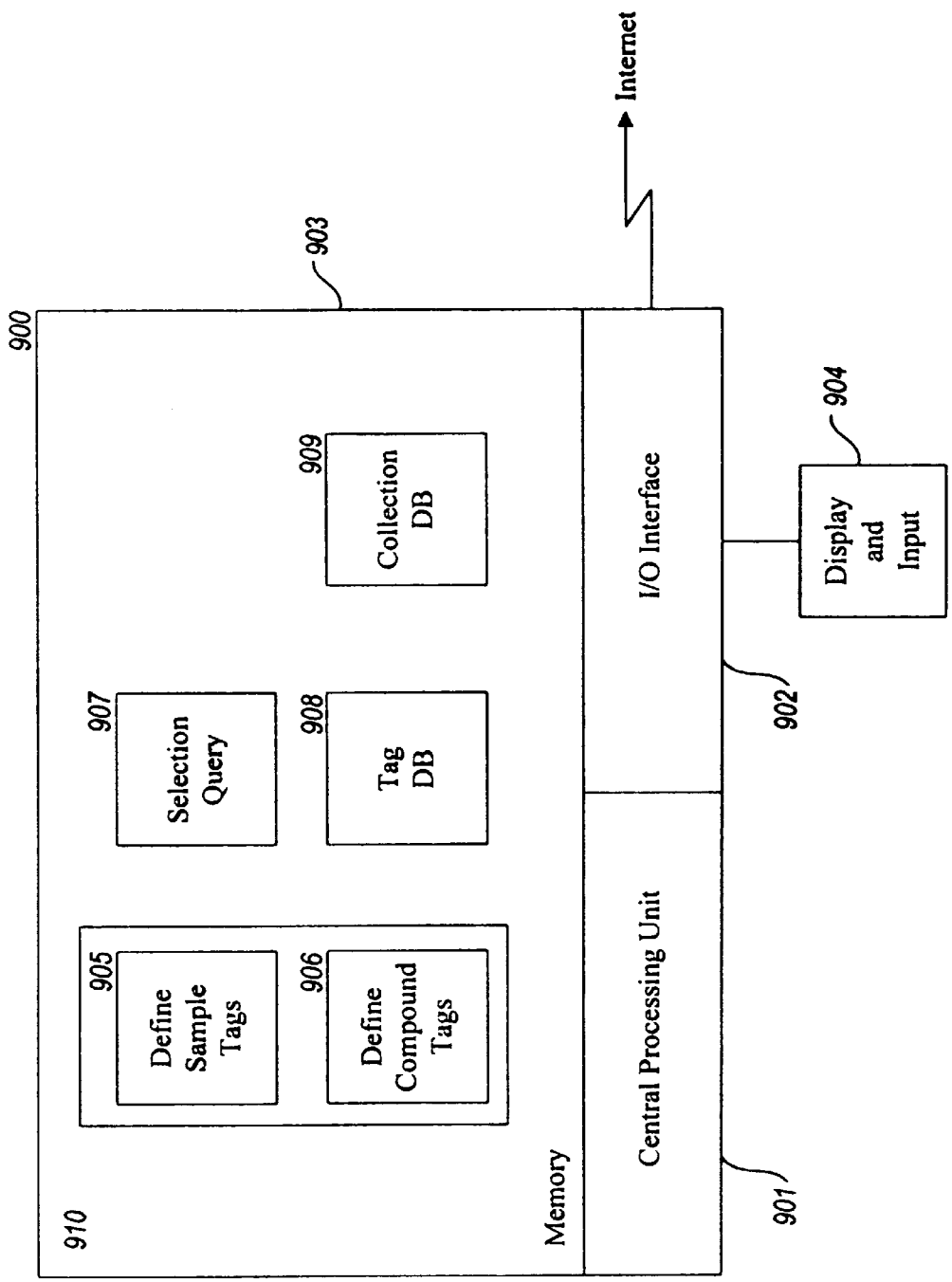
FIG. 9 is a block diagram of a computer system embodying the present invention.

FIG. 9 is a block diagram of a computer system embodying the present invention. The computer system 900 contains central processing unit 901, I/O interface 902, memory 903, and display and input devices 904. The display and input devices may include a computer display, a keyboard, and a mouse. The memory may include removable media drives, such as a CD-ROM drive, which are capable of reading information stored in a computer-readable medium such as a CD-ROM. The memory contains a tag component 910, a selection query component 907, the tag database 908, and the collection database 909. The tag component contains a define simple tag component 905 and a define compound tag component 906. The define simple tag component controls the defining of simple tags. The define compound tag component controls the defining of compound tags. The selection query component controls the displaying of the selection query grid and inputting the selection. The VQL system stores the defined tags in the tag database 908. The selection query can be applied to a collection database 909 or could also be applied through I/O interface to an external system that may be connected via the Internet.

Figure 10:
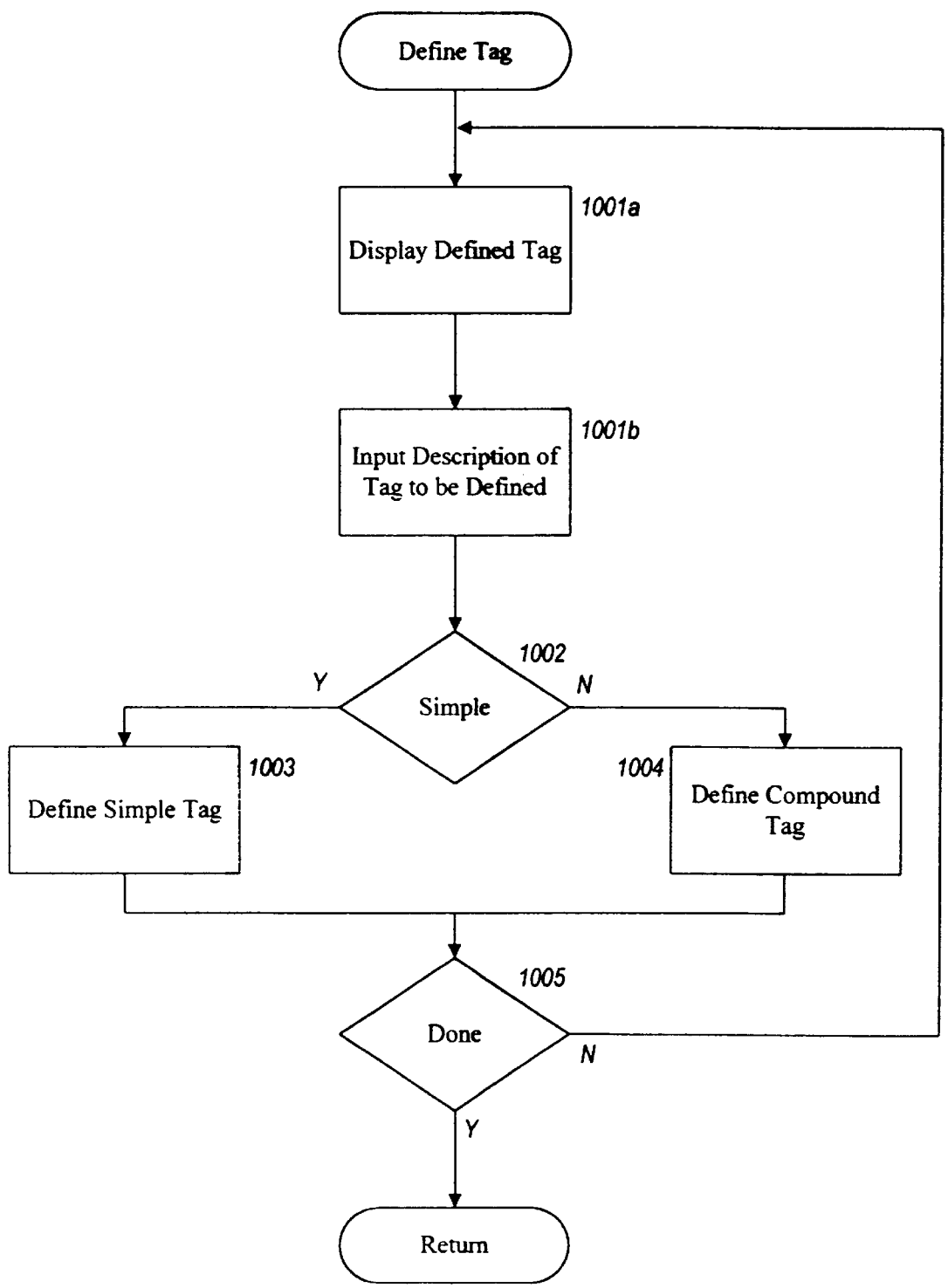
FIG. 10 is a flow diagram of an implementation of the tag component.

FIG. 10 is a flow diagram of an implementation of the tag component. This define tag routine displays the defined tags, receives an indication as to whether a tag is to be simple or compound, and invokes the appropriate routine to input the definition of the tag. In step 1001a, the routine displays the currently defined tags in a tag definition list. In step 1001b, the routine prompts the user for an optional description of the tag to be defined. In step 1002, if the user specifies to define a simple tag, then the routine continues at step 1003, else the routine continues at step 1004. In step 1003, the routine invokes the routine to define a simple tag. In step 1004, the routine invokes the routine to define a compound tag. In step 1005, if the user indicates that the definition of tags is complete, then the routine returns, else the routine loops to step 1001a to define a new tag.

Figure 11:
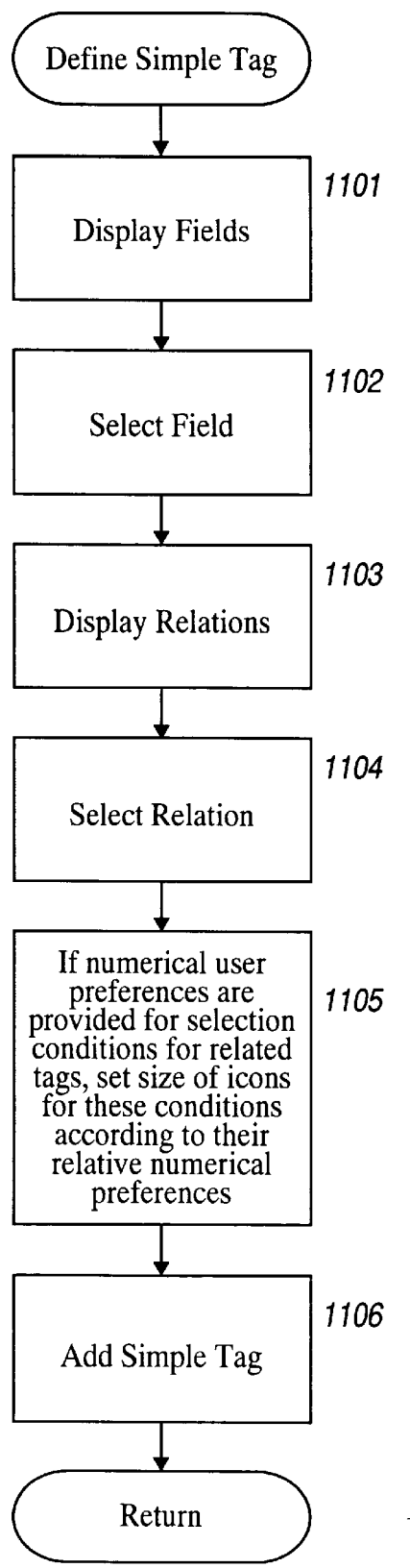
FIG. 11 is a flow diagram of an implementation of a define simple tag routine.

FIG. 11 is a flow diagram of an implementation of a define simple tag routine. This example implementation supports defining tags for database tables. In step 1101, the routine displays the various fields of the database table in a field scroll box. In step 1102, the routine inputs a selection of a field. In step 1103, the routine displays the relations that are appropriate for the selected field. In step 1104, the routine inputs a selection of a relation. In step 1105, the routine inputs a value. If the user has indicated a preference for one selection condition over another, the icons for these conditions are correspondingly sized based on relative numerical preferences which the user has accorded to them. In step 1106, the routine then adds the simple tag as a defined tag and returns. In alternate embodiments, the definition of a simple tag can include evaluations of multiple fields. For example, a simple tag for use in a credit rating system may be defined as "principal+interest>0.28*income." In such a case, the VQL system may allow the user to enter such a condition in an input field. The VQL system may check to ensure that names in the condition correspond to field names of the table.

Figure 12:
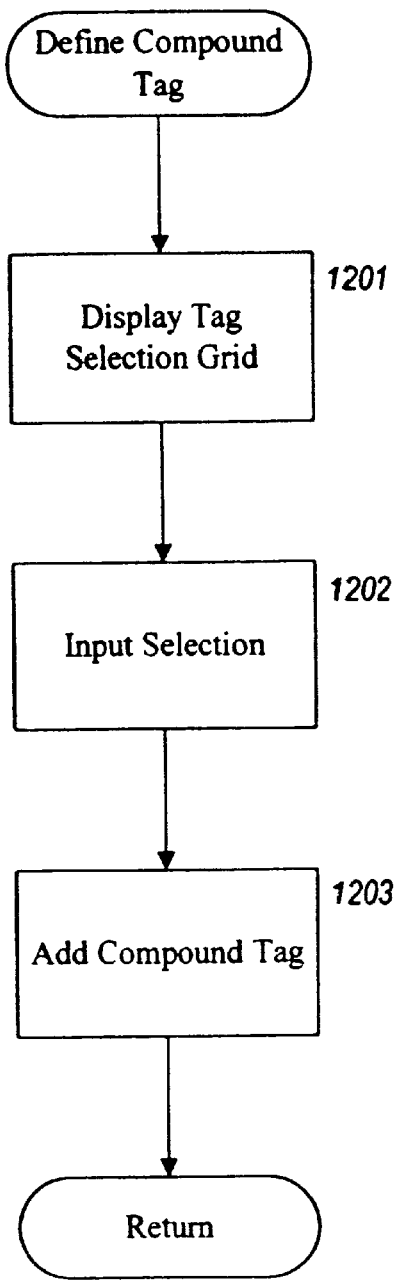
FIG. 12 is a flow diagram of an implementation of a define compound tag routine.

FIG. 12 is a flow diagram of an implementation of a define compound tag routine. In step 1201, the routine displays the selection query grid. The routine optionally allows the user to indicate which of the defined tags should be used to form the selection query grid. In step 1202, the routine inputs the selection of rows. In step 1203, the routine adds the compound tag to the tag, database and returns.

Figure 13:
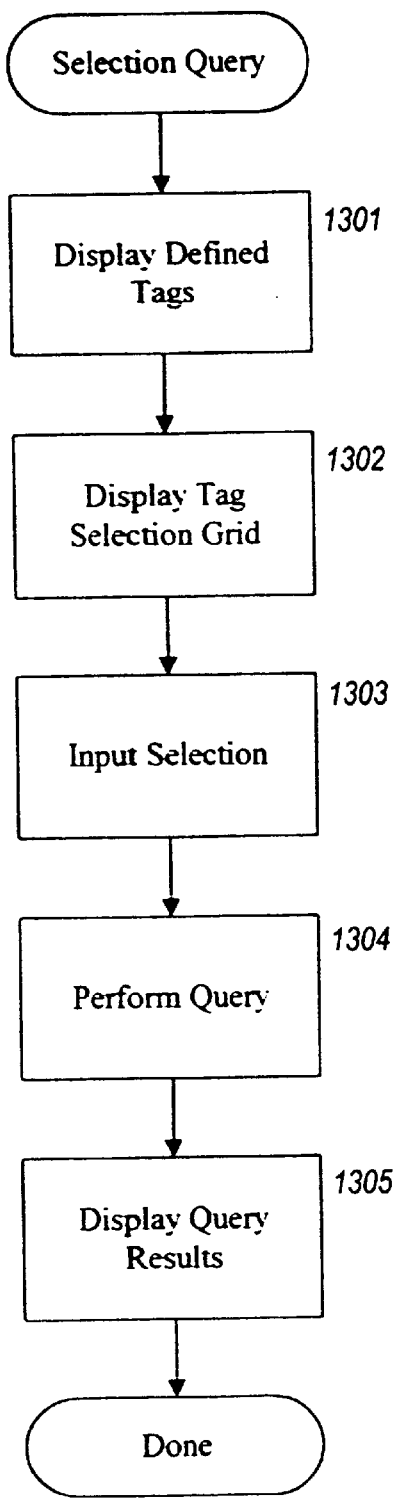
FIG. 13 is a flow diagram of an implementation of a selection query routine.

FIG. 13 is a flow diagram of an implementation of a selection query routine. The selection query routine allows a user to retrieve data based on a selection query. In step 1301, the routine displays the currently defined tags in a tag definition list. In step 1302, the routine displays the selection query grid for the currently defined tags. The routine optionally allows the user to indicate which of the defined tags should be used to form the selection query grid. In step 1303, the routine inputs a selection of rows from the selection query grid. In step 1304, the routine performs the selected query on the collection of data. In step 1305, the routine displays the results of the query and returns.

Although the present invention has been described in terms of one embodiment, it is not intended that the invention be limited to this embodiment. Modifications within the spirit of the invention would be apparent to those skilled in the art. The scope of the present invention is defined by the claims that follow.

I claim:

1. A method for use in conjunction with a computer system for displaying an indication of a preference of a condition in a selection query, the method comprising the steps of:

for each of a plurality of conditions of the selection query, receiving, from a user, a numerical indication of the preference for said each condition; and for each of the plurality of conditions, displaying a particular corresponding icon for the condition so as to define a plurality of displayed icons, the particular icon being displayed with a size, relative to sizes of other ones of the displayed icons, that corresponds to the numerical indication of the preference specified by the user for the condition;

whereby the displayed icons, by relative size differences thereamong, provide a visual cue of the relative preferences accorded by the user to the conditions in the selection query.

2. The method of claim 1 wherein the particular corresponding icon for said each condition has a unique shape, relative to other icons being displayed for other ones of the plurality of conditions for the selection query, that identifies said each condition.

3. The method of claim 2 wherein the particular corresponding icon for said each condition is a single icon that depicts the preference by the user for said each condition relative to other ones of the conditions in the query.

4. The method of claim 3 further comprising the step of:

displaying a specific icon through which the user specifies the preference to be depicted by the particular corresponding icon and associated with said each condition in the query; and wherein the specific icon is in the shape of scales used for weighing.

5. The method of claim 3 further comprising the step of:

displaying a specific icon through which the user specifies the preference to be depicted by the particular corresponding icon and associated with said each condition in the query; and wherein the specific icon is in the shape of an apothecary weight used for weighing.

6. The method of claim 3 further comprising the step of:

displaying a specific icon through which the user specifies the preference to be depicted by the particular corresponding icon and associated with said each condition in the query; and wherein the specific icon is in the shape of a dumbbell.

* * * * *

UNITED STATES PATENT AND TRADEMARK OFFICE
CERTIFICATE OF CORRECTION

PATENT NO.    : 6,111,574
DATED         : August 29, 2000
INVENTOR(S)   : Christopher A. Meek It is certified that error appears in the above-identified patent and that said Letters Patent is hereby corrected as shown below:

Column 2,
Line 28, Change "togically" to -- logically --.

Signed and Sealed this

Thirtieth Day of October, 2001

Attest:

*Nicholas P. Godici*

NICHOLAS P. GODICI
*Attesting Officer*    *Acting Director of the United States Patent and Trademark Office*